Figure 5:
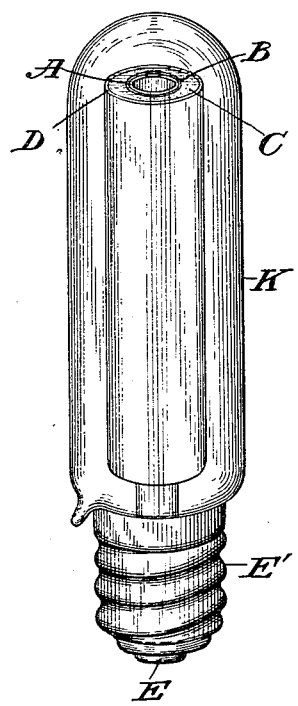

No. 866,462. PATENTED SEPT. 17, 1907.
W. J. HAMMER.
SELENIUM CELL.
APPLICATION FILED FEB. 5, 1907.
2 SHEETS—SHEET 1.
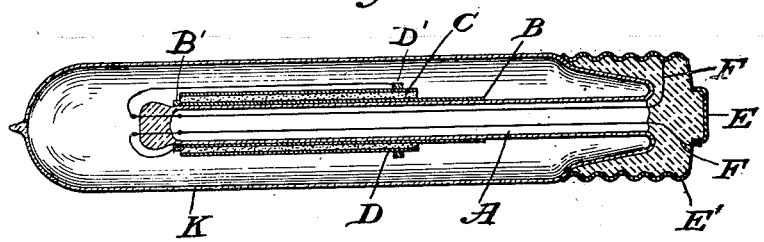
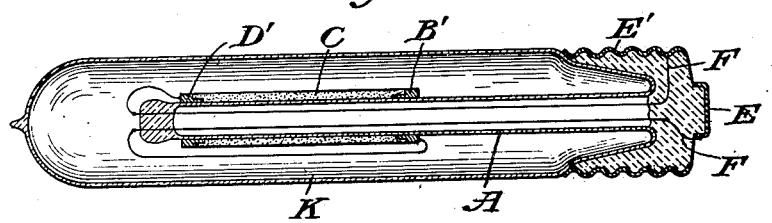
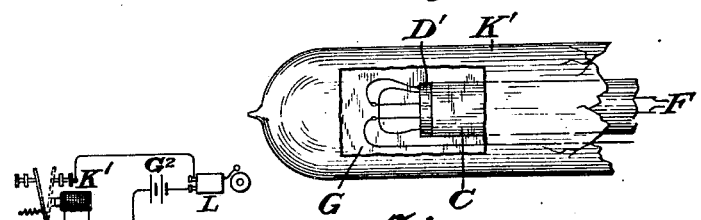
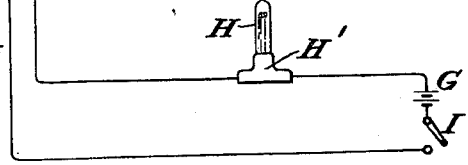
WITNESSES
Chas. F. Clagett
Anita Burke
INVENTOR
William J. Hammer,
BY
T. J. Johnston,
ATTORNEY.

No. 866,462.  
PATENTED SEPT. 17, 1907.

W. J. HAMMER.  
SELENIUM CELL.  
APPLICATION FILED FEB. 5, 1907.

2 SHEETS—SHEET 2.

WITNESSES  
Chas. F. Clagett  
Anita Burke

INVENTOR  
William J. Hammer,  
BY  
F. J. Johnston,  
ATTORNEY.

UNITED STATES PATENT OFFICE.

WILLIAM J. HAMMER, OF NEW YORK, N. Y.

SELENIUM CELL.

No. 866,462.　　　　Specification of Letters Patent.　　　　Patented Sept. 17, 1907.

Application filed February 5, 1907. Serial No. 355,902.

*To all whom it may concern:*

Be it known that I, WILLIAM J. HAMMER, a citizen of the United States, residing in New York city, in the State of New York, have made certain new and useful Improvements in Selenium Cells, of which the following is a specification.

My present invention relates to selenium cells, such as are designed for use in an electric circuit a portion of which is to be made responsive to changes in illumination.

The invention has for its object to provide a cell which shall be permanent in its characteristics and shall be readily inserted or withdrawn from the circuit; readily constructed to specification and relatively robust, so that it may be handled without the extreme care now necessary with those with which I am familiar; and at the same time, more sensitive and accurate, so that it is responsive to some forms of radiation to which older forms of cell do not respond at all.

To accomplish the ends pointed out, I have devised a structure comprising a number of features of novelty. Several different modifications embracing the same principles may be used, some of which I have described in this specification; obviously many other embodiments of the principles herein pointed out may be made. I take a tube, by preference of insulating material; in the best forms of cell, I use a fused quartz tube as the central support for the selenium. This tube I coat in any desired manner with some good conducting metal with which selenium does not readily form a compound; gold or silver may be used, and aluminium is also suitable; for some reasons I prefer the aluminium. Under some conditions, as when the best form of cell is not needed, this inner tube or support may be formed of the selected metal itself; in which case a sufficient body of it should be used to be strong enough to stand the subsequent manipulation, as will be evident. After the coating of the tube with metal, I coat the selenium upon the metal, and subject it to heat treatment; selenium in its vitreous state, is practically an insulator and is not affected electrically by exposure to light; but after heating to a high temperature for a considerable time, it is softened to a viscous or putty-like consistency, and becomes an electric conductor, though of very high resistance. While in the plastic condition, or while cooling, I roll the tube between two plates of polished glass with a moderate pressure, by which means the selenium is compacted to substantially uniform density and thickness and the outer surface thereof is polished until it is smooth and glazed in appearance. After this, I coat upon the outer surface of the selenium a thin metallic film of extreme tenuity, in fact so thin as to afford substantially no obstacle to the passage of light. Gold or silver may be employed for this film with good effect, but I have found the aluminium to be the best, since its conductivity is sufficient and very thin films of this metal are easily obtainable. The method of making the film is not important and in fact any of those now used in the arts may be employed for the purpose; the precipitation of metallic vapor produced by an electric arc in a vacuum is one method; an electrolytic deposit is another; or the film may be mechanically made by beating or rolling, and may be then secured to the selenium while still in its semi-plastic condition. Rings of good conducting metal should be placed over the metallic film terminals and so arranged that the metal in each film will only make electric connection with its appropriate ring; of course these rings should be somewhat heavier than the film, so as to possess sufficient mechanical strength. The heating of the selenium is preferably done by placing it over a Bunsen burner for the desired length of time, though of course other methods may be employed. The quartz tube presents particular facilities for this treatment since the temperature obtained in this way is insufficient to substantially affect it, and as is well known it is practically indifferent to sudden changes of temperature which would crack glass or many other substances. A modification of this particular form of tube consists of an interior insulating support with metallic ring terminals arranged thereupon, and the selenium making contact with both of these, occupying the space upon the support between the terminals. The interior support is then sealed within a tube or other envelop, also preferably of fused quartz; leads are brought through the wall of the inclosure and connected to terminals like those of an electric incandescent lamp, so that by an ordinary socket of well-known construction, the cell may be inserted in or withdrawn from an electric circuit containing any device with which it is desired to have it coöperate. The air is completely exhausted from the cell, this process also withdrawing any gases which may be occluded in the selenium, which is of more or less granular or porous structure.

Figure 6:
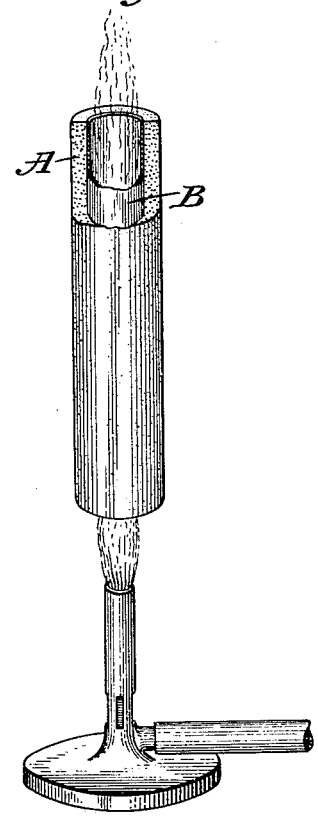

The accompanying drawings show an embodiment of my invention, Figure 1 being a view partly in section of a completed cell of the first type; Fig. 2 is a similar view of the second type, above described. Fig. 3 is a detail view of a modification. Fig. 4 shows the usual circuit arrangement. Fig. 5 shows the usual proportions of the internal support and external tube, Figs. 1 to 3 showing the support relatively smaller for clearness of illustration. Fig. 6 shows the method of reducing the selenium to a conducting form.

In the drawings, A is the central support, formed of a tube of fused quartz, although glass may sometimes be used. Next to the tube is the thin layer B, of conducting metal, forming one of the electrodes, and coated upon it is the selenium indicated at C;

while upon the outside of the selenium is the second coating D of conducting metal, made of extreme tenuity. The conductivity of these very thin films is sufficient for the purpose of the invention, since it is always desirable to have the resistance very high in the circuit in which such a cell is used; since in order to insure large proportional variations under the influence of light, the current is always minute. On this account I have been able to use gold for the coating without incurring any considerable expense, though silver may also be used; as already pointed out, however, I consider aluminium the best metal for the conducting film-terminal. Not only is this metal so white that light transmitted through it is not deprived of any of its essential components, but it is practically transparent to rays of high vibration in the end of the spectrum beyond the violet, being employed in the well known Lenard tubes. I have found aluminium to be one of the most transparent metals when interposed in the path of such rays as I particularly desire to measure or utilize in this new form of cell. Obviously other metals may be substituted, but I prefer not to use them because many of them combine with the selenium to form selenites or selenides, which are not especially sensitive to light; as this change may be progressive, they are apt to cause the cell to slowly deteriorate. These difficulties are avoided with the metals named.

At E, $E^1$, are indicated the central stud and screw-shell terminals, such as are commonly attached to an incandescent lamp; they are connected by the lead-wires F F with the films or coatings B, D, of the cell.

The outer inclosing tube or envelop is lettered K.

Turning now to Fig. 2, the same parts are illustrated and bear the same reference letters; but here the selenium C is directly exposed to the radiation and the electrodes $B^1$, $D^1$, are respectively bands of metal located at its ends.

In Fig. 3, I show a detail by which the cost of the cell may be substantially reduced and yet leave it effective. In this figure, the outside or inclosing envelop K is composed of glass, which is much cheaper and more conveniently manipulated in manufacture than the fused quartz; but I arrange in the glass tube a window G, which is composed of a thin plate of fused quartz, the edges of which are sealed into the glass. In this construction, if preferred, the inclosing envelop may be of highly colored or even black glass, so that substantially the only radiation reaching the selenium will be that which passes through the quartz window. Under some circumstances and for particular uses of the tube, envelops of other materials may be substituted for the glass, and metal may be used if desired. Where the cell is to be used to measure cathode rays or similar radiant emanations it may be desirable to make this outer envelop of a material which will exclude all rays except so far as they may enter through the quartz window, for which purpose one of the denser metals should be employed; I have found both platinum and lead to be well adapted for this purpose, lead being to be preferred on account of its low cost, unless it should be desired to use the cell where the more refractory metal would be necessary.

In Fig. 4, I show the usual circuit connections for such a cell as that which I have just described. $G^1$ is a generator or battery supplying current. H is the cell, which is in this figure inserted in the usual socket $H^1$, and I is a switch by means of which the circuit may be opened or closed. The indications are of course diagrammatic, as usual measuring instruments, resistances, etc., may be included in any combination desired. At $K'$, I show the coil of a relay which would be operated by the change of current to open and close a contact $k$, by which the circuit of the battery $G^2$ is closed through the bell L. Obviously for the bell any other form of apparatus may be substituted.

In Fig. 5, I show the usual proportions of the inner support and the outer envelop. This has the advantage of presenting a large surface to the action of the light; in practice, this would be about the proportion usually employed. Obviously, however, the particular relation of size is not important so far as the invention is concerned.

In Fig. 6, the Bunsen burner M is arranged to heat the tube, which is shown above it. The tubular form has great advantages for the invention because the heat can not only pass over the outer surface of the selenium but may be conducted to it from the inside also, so that it soon acquires the same temperature throughout and its consistency is thereby rendered more uniform. The tubular form of the quartz support has great advantages for this heating because it may be conveniently rotated so as to equalize the distribution of heat and uniformly reduce the selenium to the pasty or viscous form. Under some conditions, as when great purity of the light sensitive substance is desired, an electric heating-rod may be substituted for the Bunsen flame, being passed up inside of the tube and its temperature there maintained at the desired point. This will prevent the contamination of the selenium by the products of combustion or impurities found in the gas, which might otherwise combine with it.

In the several forms of cell with which I am familiar, and which have been used in practice, it has been customary to coat the selenium, sometimes with a binding material, upon a metallic support, usually a wire, and to insert the wire in the desired electric circuit. This not only gives rise to difficulties due to the variability of the contact resistance when the cell is inserted or withdrawn from the circuit, and to the variations due to the want of permanence in the cell from its disintegration by the differing expansions of the support and the selenium, as hereinafter pointed out, but it is also less responsive to light effects on account of the light-sensitive substance being shunted by the metallic support. In the cell which I have described these difficulties are substantially eliminated; since, as will be apparent, the preferred form of support is a good insulator and the metallic connections are of such a character that substantial differences of expansion do not occur, while the selenium is included in series in the circuit; since the specific resistance of selenium is very large, a smaller amount of this material may be used in this way and still the cell will be far more sensitive than where it is included in shunt with a metallic support which carries a large part of the current without change from varying illumination, leaving only a small portion to pass through the selenium. This makes the change of current not a direct function of the whole flow but only of the small part of it passing through the selenium. The departure of the temperature resistance curve of the metal support from that of the selenium introduces another source of variable error. Obviously when in series the entire current flow passes through the light-sensitive substance, thus making the change due to the action of the light a direct function of the current and the illumination, enormously increasing the sensitiveness as well as the accuracy of the cell.

The inclosure of the operating parts of the cell in a vacuum I find to be of great advantage. By so doing, I prevent the formation of oxids and acids, particularly of selenic acid, which may be generated by the contact of the selenium with damp air, while subjected to an electric current, especially as selenium is somewhat hygroscopic. As the selenium is also spongy or porous in its granular condition, exhausting the inclosure completely removes any air or gas which may be occluded in the pores. In fact, the use of this material in the open air explains many failures of previous experimenters which it is possible to avoid by sealing it in a vacuum.

There are several forms of radiation which are practically shut off by the passage through glass of the luminous rays containing them, though their loss is hard to detect while ordinary light rays are present; some of them are contained in nearly all light, and in order to make a just comparison between any two sources of illumination they should be included in the measurements, since many of them affect the eye as strongly as light vibrations. The various forms of radiation of exceedingly high rates of vibration, such as, cathode, ultra-violet and other similar rays (the nature of which is not yet well understood, but which appear to differ in form from visible light rays), pass readily through quartz, yet are almost wholly shut off by glass. Many of these rays are found in the radiations from the mercury-arc lamp, for example, which it is impossible to use with safety inclosed only in a tube of fused quartz, since the exposure of the operator to its action for even a few seconds results in very serious trouble, leading sometimes to total blindness, and also sometimes affecting the brain.

Where the light, as is sometimes the case, does not pass through the film next to the support, it need not be so tenuous; and in fact, it may well be of sufficient thickness to dispense with the inner support. This is not so good a construction, because the differing co-efficients of expansion of substantial bodies of selenium and other metals may cause the light-sensitive substance to crack away from the support; for this reason, in the best forms of cell the interior support should be formed of fused quartz, the co-efficient of expansion of which is quite small; in fact, with the heat from the currents ordinarily used in these circuits, the amount of its expansion is negligible. From my specification it is obvious that the best forms of cell should also have the entire surrounding envelop of fused quartz, not only on account of its permeability to vibrations which are excluded by glass, but also because of its permanence and its freedom from fractures due to sudden changes of temperature.

The extent to which the best form may be departed from in practice depends upon the character of the work in which the cell is to be used, the precision of results to be attained, and the permissible expense. I have in this specification indicated not only the best forms now known to me, but several respects in which those forms may be departed from, and in general the results (so far as I know them) of the departures upon the cost of the cell, and upon its adaptability to its intended purposes.

So far as I am aware, I am the first to inclose a selenium cell in a quartz tube, as well as the first to connect such a tube in the circuit in the manner described; to form at least one electrode or circuit-connection of a film of metal having a reinforcing ring; to use a surrounding envelop having a quartz window sealed in its wall; to inclose the selenium in a vacuum, formed by the quartz inclosure, in whole or in part; and, finally, to arrange the selenium in a single body in series in the electric circuit, in such a manner that the entire current-flow in the circuit passes through it, the advantages of which I have already pointed out. To all these features of novelty I wish to make broad claims.

In my parallel pending applications Serial Numbers 341,425 and 341,426, filed October 31st, 1906, I have indicated certain particular utilities of the selenium cell which are best availed of by the particular form of cell here described; in this case, however, I claim only the construction of the cell itself, to whatever purposes it may be applied.

Having thus described my invention, what I claim and wish to protect by said Letters-Patent of the United States is:

1. In a selenium cell, the combination of a support for the selenium with connections for its insertion in an electric circuit, and an inclosing vessel consisting in part at least of fused quartz.

2. In a selenium cell, the combination of the selenium with means for connecting it to an exterior circuit, and an inclosing vessel consisting in part at least of fused quartz, constituting a vacuous inclosure.

3. In a selenium cell, the combination of an interior support of tubular form, the selenium and electric connections therefor, and a vessel consisting in part at least of fused quartz forming therefor a vacuous inclosure.

4. In a selenium cell, the combination, with the support, of a coating of selenium having thin films of metal deposited thereon constituting circuit terminals between which the selenium is inclosed, such films being substantially permeable to light.

5. In a selenium cell, the combination, with the support, of selenium inclosed between thin films of metal substantially permeable to light and constituting circuit terminals, with an inclosing vessel consisting in part at least of fused quartz and forming a vacuous inclosure.

6. In a selenium cell, the combination of the central support carrying a metallic terminal, selenium coated upon said central support and making electric connection with the metallic terminal, a second metallic terminal also electrically connected to the selenium, and an inclosing vessel consisting in part at least of fused quartz, constituting a vacuous inclosure.

7. In a selenium cell, the combination, with the central support and metallic terminals carried thereby, of selenium coated thereupon so as to make electrical connection with the metallic terminals, the selenium being compacted until its surface is substantially smooth.

8. In a selenium cell, the combination, with the central support, of a film of conducting metal with means for connecting it to an exterior circuit, a compacted body of selenium coated upon the film, a second film coated upon the selenium and also having means for connection to the outside circuit, one at least of the films being substantially permeable to light; and an inclosing vessel in part at least of transparent material, constituting a vacuous inclosure.

9. In a selenium cell, the combination with the central support, of a metallic terminal carried thereby, a lead-in wire connected to the terminal, selenium coated upon the support and in electric contact with the terminal, a second terminal also in contact with the selenium and provided with a lead-in wire, and an inclosing vessel in part at least transparent constituting a vacuous inclosure; the lead-in wires passing through the wall of the inclosure respectively to a central terminal and a screw-shell terminal.

10. In a selenium cell, the combination with a surrounding at least partly transparent envelop provided with central stud and screw-shell terminals, of a tubular internal support, metallic terminals carried thereby, lead-in wires passing through the tubular support and connected to the terminals within and without the inclosure, and selenium arranged in series between the terminals upon the support.

11. The combination, with a partly transparent envelop forming a vacuous inclosure and provided with central stud and screw-shell terminals of the incandescent lamp type, of a central tubular support, terminals carried thereby consisting of thin films of metal; lead-in wires passing through the tubular support and making connections between the terminals within and without the inclosure, and selenium interposed between the metallic films.

12. The combination, with a compacted body of selenium arranged in series between terminals and a support therefor, of a surrounding envelop in part at least transparent and provided with screw-shell and central stud terminals, and electric connections from the selenium to the terminals, the envelop forming a vacuous inclosure.

13. A selenium cell of the incandescent lamp type, comprising an inclosing envelop consisting in part at least of fused quartz and forming a vacuous inclosure for the selenium, screw-shell and central stud terminals upon the outside of the envelop, and means for connecting the selenium to the terminals outside of the envelop.

14. In a selenium cell, the combination with the central support, of metal deposited thereon, selenium coated upon the metal, a film of metal deposited upon the outside of the selenium, and connections from the metal to the external circuit.

15. In a selenium cell, the combination with a central support, of a thin film of metal deposited thereon, a coating of selenium upon the film, a second film upon the selenium, connections from the films to an outside circuit and an envelop for the cell, constituting a vacuous inclosure.

16. The combination, with an insulating support, of the selenium and films of metal forming circuit terminals therefor.

17. As a terminal for making contact with selenium in an electric circuit, a substantially transparent film of aluminium.

18. A surrounding envelop for a selenium cell, having a transparent window sealed in its wall.

19. A surrounding envelop for a selenium cell, having a fused quartz window sealed in its wall.

20. In a selenium cell, a surrounding envelop of glass, having a window of fused quartz.

21. A surrounding envelop for a selenium cell, consisting of substantially opaque material having a transparent window sealed in its wall.

22. A surrounding envelop for a selenium cell, composed of substantially opaque glass having a fused quartz window sealed in its wall.

23. In a selenium cell, a surrounding envelop of dark glass, having a window of fused quartz sealed into its wall.

24. In a selenium cell, the combination with an insulating support for the selenium, of terminals carried by the support and a compacted body of selenium arranged upon the support in series between the terminals.

25. In a selenium cell, the combination of metallic terminals, an insulating support, selenium arranged in series between the terminals and a surrounding envelop consisting in part at least of fused quartz; forming a vacuous inclosure.

26. In a selenium cell, the combination of an inclosing envelop consisting in part at least of fused quartz, metallic terminals upon a central support within the inclosure and metallic terminals upon the inclosing vessel outside of the inclosure, electric connections between the two sets of terminals, and selenium interposed between the terminals within the inclosure.

27. In a selenium cell, the combination, with an insulating support, of the selenium and ring terminals, between which the selenium is placed in series in a compacted body.

WILLIAM J. HAMMER.

Witnesses:
T. J. JOHNSTON,
IRVING M. OBRIEGHT.